United States Patent
Karabulut et al.

(10) Patent No.: US 12,273,462 B2
(45) Date of Patent: Apr. 8, 2025

(54) LOW-COST, HIGH-SECURITY SOLUTIONS FOR DIGITAL SIGNATURE ALGORITHM

(71) Applicant: Microsoft Technology Licensing, LLC, Redmond, WA (US)

(72) Inventors: Emre Karabulut, Raleigh, NC (US); Bharat S. Pillilli, El Dorado Hills, CA (US); Mojtaba Bisheh Niasar, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 18/077,043

(22) Filed: Dec. 7, 2022

(65) Prior Publication Data

US 2024/0113890 A1 Apr. 4, 2024

Related U.S. Application Data

(60) Provisional application No. 63/412,036, filed on Sep. 30, 2022.

(51) Int. Cl.
*H04L 9/32* (2006.01)

(52) U.S. Cl.
CPC .......... *H04L 9/3247* (2013.01); *H04L 9/3242* (2013.01)

(58) Field of Classification Search
CPC ............................ H04L 9/3247; H04L 9/3242
See application file for complete search history.

(56) References Cited

U.S. PATENT DOCUMENTS

| 2011/0213982 A1* | 9/2011 | Brown | H04L 9/3252 713/176 |
| 2013/0073873 A1* | 3/2013 | Morioka | H04L 9/3249 713/193 |

FOREIGN PATENT DOCUMENTS

| EP | 2378707 A1 | 10/2011 |
| EP | 2553866 A1 | 2/2013 |

OTHER PUBLICATIONS

Ciet, et al., "(Virtually) Free Randomization Techniques for Elliptic Curve Cryptography", In Proceedings of the 5th International Conference of the Information and Communications Security, Oct. 10, 2003, pp. 348-359.
"International Search Report and Written Opinion Issued in PCT Application No. PCT/US23/028301", Mailed Date: Nov. 6, 2023, 13 Pages.

* cited by examiner

*Primary Examiner* — Huan V Doan
(74) *Attorney, Agent, or Firm* — Schwegman Lundberg & Woessner, P.A.

(57) ABSTRACT

Generally discussed herein are devices, systems, and methods for digital signature generation security. A method can include generating, by a first device, a first random number, in generating a signature for a communication, masking, using the first random number, only a private key, a hash of the communication, or a combination thereof, and providing the signature with the communication to a second device.

7 Claims, 4 Drawing Sheets

500

550 — GENERATING, BY A FIRST DEVICE, A FIRST RANDOM NUMBER

552 — IN GENERATING A SIGNATURE FOR A COMMUNICATION, MASKING, USING THE FIRST RANDOM NUMBER, ONLY A PRIVATE KEY, A HASH OF THE COMMUNICATION, OR A COMBINATION THEREOF

554 — PROVIDING THE SIGNATURE WITH THE COMMUNICATION TO A SECOND DEVICE

LOW-COST, HIGH-SECURITY SOLUTIONS FOR DIGITAL SIGNATURE ALGORITHM

RELATED APPLICATION

This application claims the benefit of priority to U.S. Provisional Patent Application No. 63/412,036, titled "Low-Cost, High-Security Solutions for Digital Signature Algorithm", and filed on Sep. 30, 2022, which is incorporated herein by reference in its entirety.

BACKGROUND

Side-Channel Analysis (SCA) attacks pose a significant threat to the security of cryptographic implementations because they exploit some information (e.g., power consumption or electromagnetic radiation) that can be observed from the execution of an algorithm on a device to recover the secret key. SCA attacks can be divided into two main groups: single-trace and multi-trace attacks. A single trace attack attempts to recover a secret through observation of information flowing through a single conductor path of a circuit. A multi-trace attack attempts to recover a secret through observation of information flowing through multiple, related conductor paths of a circuit.

Countermeasures try to reduce the correlation between the targeted secret and captured side-channel measurement. Each known countermeasure, however, adds overhead costs to a cryptography system design. The overhead can include increased power consumption, increased time to generate a key, sign a message, or verify a key, increased circuitry footprint, among others.

Although single trace attacks can be overcome with lightweight countermeasures, it is costly to mitigate multi-trace attacks. A formal approach to mitigate multi-trace side-channel attacks is to fully mask all operations of the cryptography circuitry. Such masking, however, has considerable overhead, affecting the area, power consumption, latency, and/or throughput by a factor of two or three at least.

SUMMARY

A device, system, method, and computer-readable medium configured for low compute resource cost and high security operation are provided. Lightweight masking, where only a portion of cryptographic operations are masked are provided. The portion of the cryptographic operations that are masked can be multi-trace operations that are subject to attack and secured by masking.

A method for digital signature algorithm security can include generating, by a first device, a first random number. The method can further include, in generating a signature for a communication, masking, using the first random number, only a private key, a hash of the communication, or a combination thereof. The method can further include providing the signature with the communication to a second device.

Masking the private key, the hash of the communication, or a combination thereof can consist of masking only the private key. The method can further include subtracting the first random number from the private key resulting in P1. The method can further include operating, in a first iteration of multiplication and addition circuitry, on P1 resulting in a first result. The method can further include operating, in a second iteration of the multiplication and addition circuitry, on the first random number resulting in a second result. The method can further include combining the first and second results to generate the signature.

The method can further include providing, by a multiplexer, P1 for the first iteration and the first random number for the second iteration. The method can further include providing, by a register, the first random number to the multiplexer. The method can further include providing, by a register and during a first clock cycle, the first result. The method can further include providing, by the register and during a second clock cycle, the second result.

Masking the private key, the hash of the communication, or a combination thereof can consist of masking only the private key and the hash of the communication. The method can further include generating a second random number. The method can further include subtracting the first random number from the private key resulting in P1. The method can further include subtracting the second random number from the hash of the communication resulting in H1. The method can further include operating, in a first iteration of multiplication and addition circuitry, on P1 and H1 resulting in a first result. The method can further include operating, in a second iteration of the multiplication and addition circuitry, on the first random number and the second random number resulting in a second result. The method can further include combining the first and second results to generate the signature.

The method can further include providing, by a first multiplexer, P1 for the first iteration and the first random number for the second iteration. The method can further include providing, by a second multiplexer, H1 for the first iteration and the second random number for the second iteration. The method can further include providing, by a first register, the first random number to the first multiplexer. The method can further include providing, by a second register, the second random number to the second multiplexer. The method can further include providing, by a third register and during a first clock cycle, the first result. The method can further include providing, by the third register and during a second clock cycle, the second result.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Embodiments rely on a comprehensive analysis of an efficient implementation of elliptic curve digital signature algorithm (ECDSA). Based on this comprehensive analysis, a threat model was defined to pinpoint the single-trace and multi-trace attack points. Rather than simply masking all operations performed by the digital signature algorithm, embodiments only mask necessary locations and provide a low-cost solution with high security.

ECDSA does the same thing as any other digital signing signature, but more efficiently. This is due to ECDSA's use of smaller keys to create the same level of security as any other digital signature algorithm. ECDSA can be used to create ECDSA certificates, which is a type of electronic document used for authentication of the owner of the certificate. Certificates contain information about the key used to create the certificate, information about the owner of the certificate, and the signature of the issuer of the certificate, who is a verified trusted entity. This trusted issuer is normally a certificate authority which also has a signed certificate, which can be traced back through the chain of trust to the original issuing certificate authority.

The way ECDSA works is that an elliptic curve is analyzed, and a point on the curve is selected. That point is multiplied by another number, thus creating a new point on the curve. The new point on the curve is very difficult to find, even with the original point at your disposal. The complexity of ECDSA means that ECDSA is more secure against current methods of encryption cracking encryptions. Along with being more secure against current attack methods, ECDSA also offers a variety of other benefits as well.

A summary of standards ECDSA is provided. Suppose client 1 wants to send a signed message to client 2. Initially, they must agree on parameters (C, G, n) of a curve. C is the elliptic curve field and equation, G is a base point on the elliptic curve, and n is the integer order of G. n is prime and referred to as "p" below. Client 1 creates a key pair comprising a private key less than n, and a public key curve point, Q, that is the private key×G, where "x" represents elliptic curve point multiplication by a scalar. Then client 1 signs the message by:

(i) generating a hash of the message;
(ii) select an ephemeral key, k, where k is less than n;
(iii) determine a curve point k×G;
(iv) calculate r=(x-value of curve point from (iii) mode n);
(v) calculate $s=k^{-1}$((most significant bits (same number of bits as n) of hash of message)+r*private key) mod n; and
(vi) provide signature (r, s)

Although masking is a relatively expensive countermeasure, a masking solution of some embodiments leverages the private ephemeral key of a DSA to reduce this cost. First, embodiments does not require or include masking the entire signing scheme, only masking as part of (v). Embodiments mask only a proper subset of the signing scheme. Embodiments can, for example, mask a first multiplication operation between the private key and a known signature part. Second, embodiments reduce randomness and complexity cost. Since the ephemeral key cannot be zero (0), the first masked operation can be easily propagated to the ephemeral key multiplication. Unlike the private key, some embodiments do not split the ephemeral key into two shares. Splitting the ephemeral key reduces the randomness compared to solutions that split the ephemeral key. Therefore, embodiments can work on two split shares (splitting one or more of the private key and hashed message) rather than four split shares (splitting one or more of the private key and hashed message as well as the ephemeral key).

Figure 1:
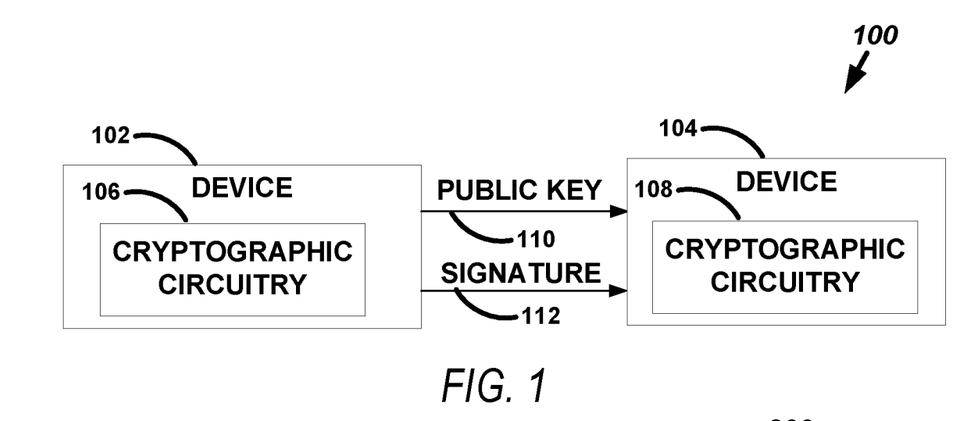
FIG. 1 illustrates, by way of example, a diagram of an embodiment of a system that includes a signing device and a verifying device.

FIG. 1 illustrates, by way of example, a diagram of an embodiment of a system 100 that includes a signing device 102 and a verifying device 104. The signing device 102 includes cryptographic circuitry 106 that uses cryptographic techniques to provide verification that the device 102 is authentic. The cryptographic circuitry 106, 108 can implement a DSA technique, such as ECDSA or another DSA technique. The devices 102, 104 can include any devices for which identity verification is performed or possible. Such devices include components of a computer or the computer itself (e.g., a laptop computer, smartphone, desktop computer, smart appliance, vehicle, or the like).

The signing device 102 generates a public and private key pair and signs a communication using the private key. The verifying device 104 performs computations on the signature to assure that the signing device 102 is indeed the device that issued the communication. Each of the generating the key, signing the communication, and verifying the key are performed by the cryptographic circuitry 106, 108. The device 102 generates a public key 110 and a private key pair. The device 102 signs communications by encrypting a message using a private key. The public key 110 can be used to decrypt the communication, the signature 112, or a combination thereof. The signature 112 can include a hash of contents of the communication and the hash of the communication can be encrypted using the private key.

A key generation algorithm has two steps of operations. First, the key generation algorithm employs a random number generator, such as a hash-based message authentication code (HMAC) deterministic random bit generator (DRBG) engine, to generate a private key. The private key is then used to generate the public key 110. The public key 110 generation operation consists of multiplication, called scalar multiplication. The operands of the multiplication are a private key and a known value. Key generation does not possess a threat for multi-trace attacks. The key generation is subject to a single-trace attack including simple-power-analysis (SPA) and horizontal power attacks.

A signing algorithm includes the same steps as a key generation algorithm, but has additional operations. The additional operations are modular integer multiplications and additions. The modular multiplications and additions possess multiple side-channel threats.

A verifying algorithm works with public values and thus it does not possess a SCA attack threat.

A summary of this analysis is given with the following tables 1 and 2 where the columns show the operation, its vulnerability, and its protection against the described vulnerability.

TABLE 1

Cryptography key generation operations and corresponding vulnerabilities and protections
Key Generation Algorithm

| Operation | Vulnerable to Attack | Protection Method |
| --- | --- | --- |
| Private Key = HMAC DRBG | X | X |

TABLE 1-continued

Cryptography key generation operations and
corresponding vulnerabilities and protections
Key Generation Algorithm

| Operation | Vulnerable to Attack | | Protection Method | |
|---|---|---|---|---|
| Public Key = Private Key * G | 1. | Timing Attacks | 1. | Montgomery Ladder Multiplication |
| | 2. | SPA | | |
| | 3. | Horizontal SCA | 2. | Scalar Blinding |
| | | | 3. | Scalar Blinding |

TABLE 1

Cryptography signing operations and
corresponding vulnerabilities and protections
Signing Algorithm

| Operation | Vulnerable to Attack | | Protection Method | |
|---|---|---|---|---|
| h = HASH (message) | X | | X | |
| Ephemeral Key (k) = HMAC DRBG | X | | X | |
| r = Ephemeral Key × G | 1. | Timing Attacks | 1. | Montgomery Ladder Multiplication |
| | 2. | SPA | | |
| | 3. | Horizontal SCA | 2. | Scalar Blinding |
| | | | 3. | Scalar Blinding |
| s = $k^{-1}$ * (h + r * private Key) | 1. | Timing Attacks | 1. | Lightweight Masking |
| | 2. | SPA | 2. | Lightweight Masking |
| | 3. | Horizontal SCA | 3. | Lightweight Masking |
| | 4. | CPA, DPA | 4. | Lightweight Masking |

Embodiment uses an efficient masking approach to address the issue. Masking randomizes the intermediate values of an implementation by splitting them into two or more "shares" that are processed independently and when added later return the expected value.

In the DSA algorithm, there are two secret values, an ephemeral key, k, and a private key, that perform the signing routine. If masking was performed using both k and the private key, then the design cost would approximately increase by at least 10× in modular integer operations, which in turn increases a cost in terms of area, power and potentially making the design time convergence worse. Embodiments can mask only the private key, and not mask the ephemeral key, to provide masking level security for all modular integer operations and reuse the base design by only changing the sequencer of the design.

Figure 2:
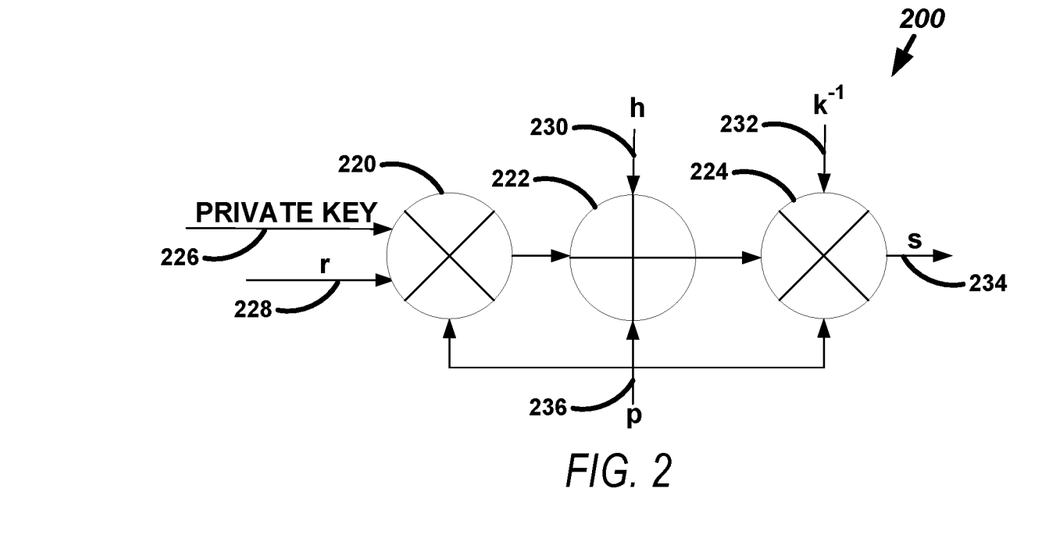
FIG. 2 illustrates, by way of example, a diagram of an embodiment of a cryptographic circuit without masking.

FIG. 2 illustrates, by way of example, a diagram of an embodiment of a cryptographic circuit 200 without masking. The circuit 200 as illustrated includes modular operations. The modular operations include multiplication 220, addition 222, and multiplication 224. The multiplication 220 receives a private key 226 and a random number, r 228, and performs modular multiplication on the private key 226 and r 228 based on a prime number, p 236. Modular multiplication includes multiplying the inputs together and then performing a modulo operation on the result of the multiplication. For example, if the private key is 4, r is 2, and p is 7, the result of the modular multiplication is 1 (i.e. (4*2) mod 7=1).

The result of the multiplication 220 is provided as input to a modular addition 222 with a hash, h 230, of a communication. Modular addition performs a standard addition followed by a modulo operation on the result of the addition. For example, if the result of the multiplication 220 is 1, and h is 2, the result of the addition 222 would be 3 (i.e. (1+2) mod 7=3).

The result of the modular addition 222 is provided to another modular multiplication 224 along with an inverse of an ephemeral key, $k^{-1}$ 232. Note the ephemeral key is k, and the inverse of the ephemeral key is $k^{-1}$. An inverse of the ephemeral key is a modulo inverse. $k^{-1}$ is thus the value that solves the following equation: $(k*k^{-1})$ mod p=1. For example, if k is 5 and p is 7, $k^{-1}$ is 3 because (5*3) mod 7=1. An output, s 234, of the multiplication 224 is provided as the result. Continuing with the example provided so far, assume the result of the addition 222 is 3, and $k^{-1}$=3, then the result, s 234 is equal to 2 (i.e. (3*3) mod 7=2).

Figure 3:
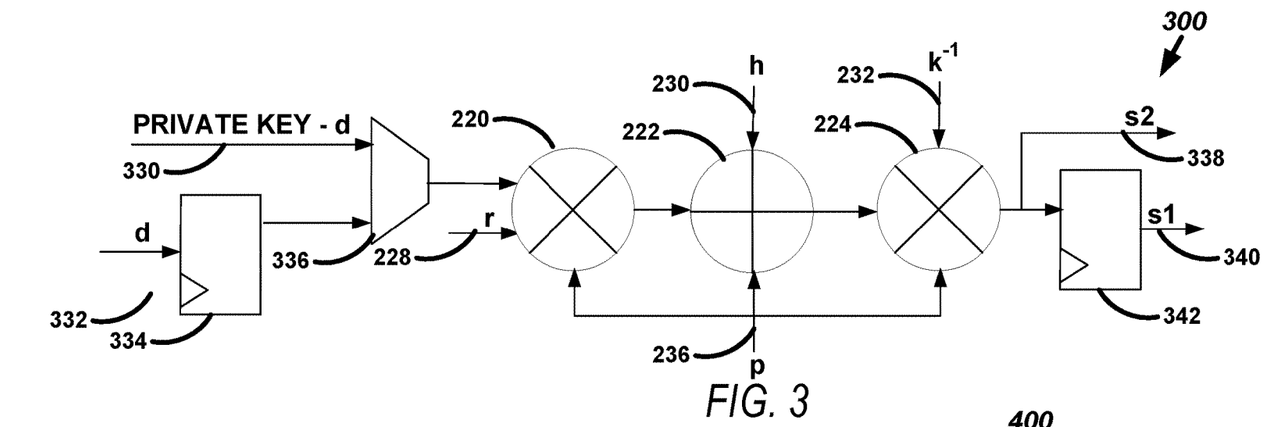
FIG. 3 illustrates, by way of example, a diagram of an embodiment of a cryptographic circuit with lightweight masking of just the private key.

FIG. 3 illustrates, by way of example, a diagram of an embodiment of a cryptographic circuit 300 with lightweight masking of just the private key 226. The circuit 300 is similar to the circuit 200 with the circuit 300 including the private key 226 split into two shares, the private key minus a random number and the random number, d, and circuitry to handle the two shares. The private key minus d is referred to as P1 330. The random number is referred to as P2 332. The following holds: private key=P1+P2. Two shares is merely an example and more shares are within the scope of embodiments. The circuitry to handle the two shares includes a register 334, a multiplexer 336, and another register 342.

P1 330 is provided as a first input to a multiplexer 336. The output of the register 334 is provided as a second input to the multiplexer 336. A control circuit (not shown) selects P1 330 in a first iteration. The multiplication 220 multiplies P1 330 and r 228. The result of the multiplication 220 is provided to the addition 222 that adds h 230 to the result of the multiplication 220. The result of the addition 222 is provided to the multiplication 224 that multiplies the inverse of the ephemeral key 232 with the result of the addition 222. The result 340 of the first iteration is provided to a register 342. The register 342, after a next clock cycle will output the result 340.

In a next iteration, the control circuit can choose P2 332 as the output of the multiplexer 336. The multiplication 220 multiplies P2 332 and r 228. The result of the multiplication 220 is provided to the addition 222 that adds h 230 to the result of the multiplication 220. The result of the addition 222 is provided to the multiplication 224 that multiplies the inverse of the ephemeral key, $k^{-1}$ 232 with the result of the addition 222. The result 340 of the next iteration is provided to the register 342. The register 342, after a next clock cycle will output the result 338. The results 338, 340, when added, sum to an expected cryptography result. The masking performed in the circuit 300 thwarts multi-trace SCA.

The following table 3 compares the lightweight masking operations to the unprotected operations.

TABLE 3 comparing circuit 300 and circuit 200 operation

| Share 1 | Share 2 | Unprotected |
|---|---|---|
| PR1 = r*P1 | PR2 = r*P2 | PR = r* private key |
| PRH1 = PR1 + h | PRH2 = PR2 + h | PRH = PR + h |
| s1 = $k^{-1}$ * PRH1 | s2 = $k^{-1}$ * PRH2 | s = $k^{-1}$ * PRH |

Figure 4:
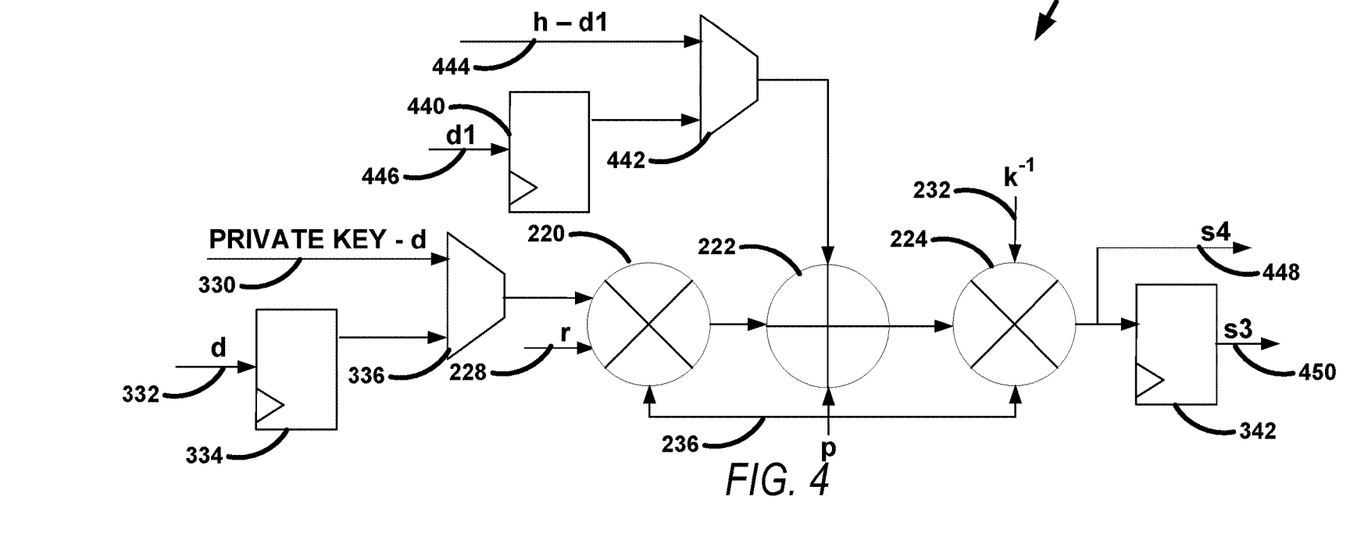
FIG. 4 illustrates, by way of example, a diagram of an embodiment of a cryptographic circuit with lightweight masking of just the private key and the hashed message.

FIG. 4 illustrates, by way of example, a diagram of an embodiment of a cryptographic circuit 400 with lightweight masking of only both the private key 226 and the hashed message 230. The circuit 400 is similar to the circuit 300 with the circuit 400 including the hashed message 230 split into two shares, (i) the hashed message minus a random number, d1, and (ii) the random number, d1, and circuitry to handle the two shares of the hashed message 230. The hashed message 230 minus d1 is referred to as H1 444. The random number, d1, is referred to as H2 446. The following holds: hashed message, h 230 is equal to the sum of the shares H1 and H2 (i.e. h=H1+H2). Two shares is merely an example and more shares are within the scope of embodiments. The circuitry to handle the two shares of the hashed message, h 230, includes a register 440, and a multiplexer 442.

As in the circuit 300, P1 330 is provided as a first input to a multiplexer 336. The output of the register 334 is provided as a second input to the multiplexer 336. A control circuit (not shown) selects P1 330 in a first iteration. The multiplication 220 multiplies P1 330 and r 228. The result of the multiplication 220 is provided to the addition 222.

H1 444 is provided as a first input to a multiplexer 442. The output of the register 440 is provided as a second input to the multiplexer 442. A control circuit (not shown) selects H1 444 in a first iteration to the addition 222. The addition 222 adds H1 444 to the result of the multiplication 220. The result of the addition 222 is provided to the multiplication 224 that multiplies the inverse of the ephemeral key 232 with the result of the addition 222. The result 450 of the first iteration is provided to the register 342. The register 342, after a next clock cycle will output the result 450.

In a next iteration, the control circuit can choose P2 332 as the output of the multiplexer 336. The multiplication 220 multiplies P2 332 and r 228. The result of the multiplication 220 is provided to the addition 222. In this next iteration, the control circuit selects H2 446 as the output of the multiplexer 442. In this next iteration, the addition 222 adds H2 446 to the result of the multiplication 220. The result of the addition 222 is provided to the multiplication 224 that multiplies the inverse of the ephemeral key 232 with the result of the addition 222. The result 448 of the next iteration is provided to the register 342. The register 342, after a next clock cycle will output the result 448. The results 448, 450, when added, sum to an expected cryptography result. The masking performed in the circuit 400 thwarts multi-trace SCA.

The following table 4 compares the lightweight masking operations to the unprotected operations.

TABLE 4 comparing circuit 400 and circuit 200 operation

| Share 1 | Share 2 | Unprotected |
| --- | --- | --- |
| PR1 = r*P1 | PR2 = r*P2 | PR = r* private key |
| PRH1 = PR1 + H1 | PRH2 = PR2 + H2 | PRH = PR + h |
| s1 = $k^{-1}$ * PRH1 | s2 = $k^{-1}$ * PRH2 | s = $k^{-1}$ * PRH |

The protection afforded by embodiments can include minimal additional hardware resources. It increases the execution time of a signing step, with a minimal overhead on the DSA. For the random number generation, an already existing random number generator, such as the HMAC DRBG, that is already part of the DSA can be used.

Figure 5:
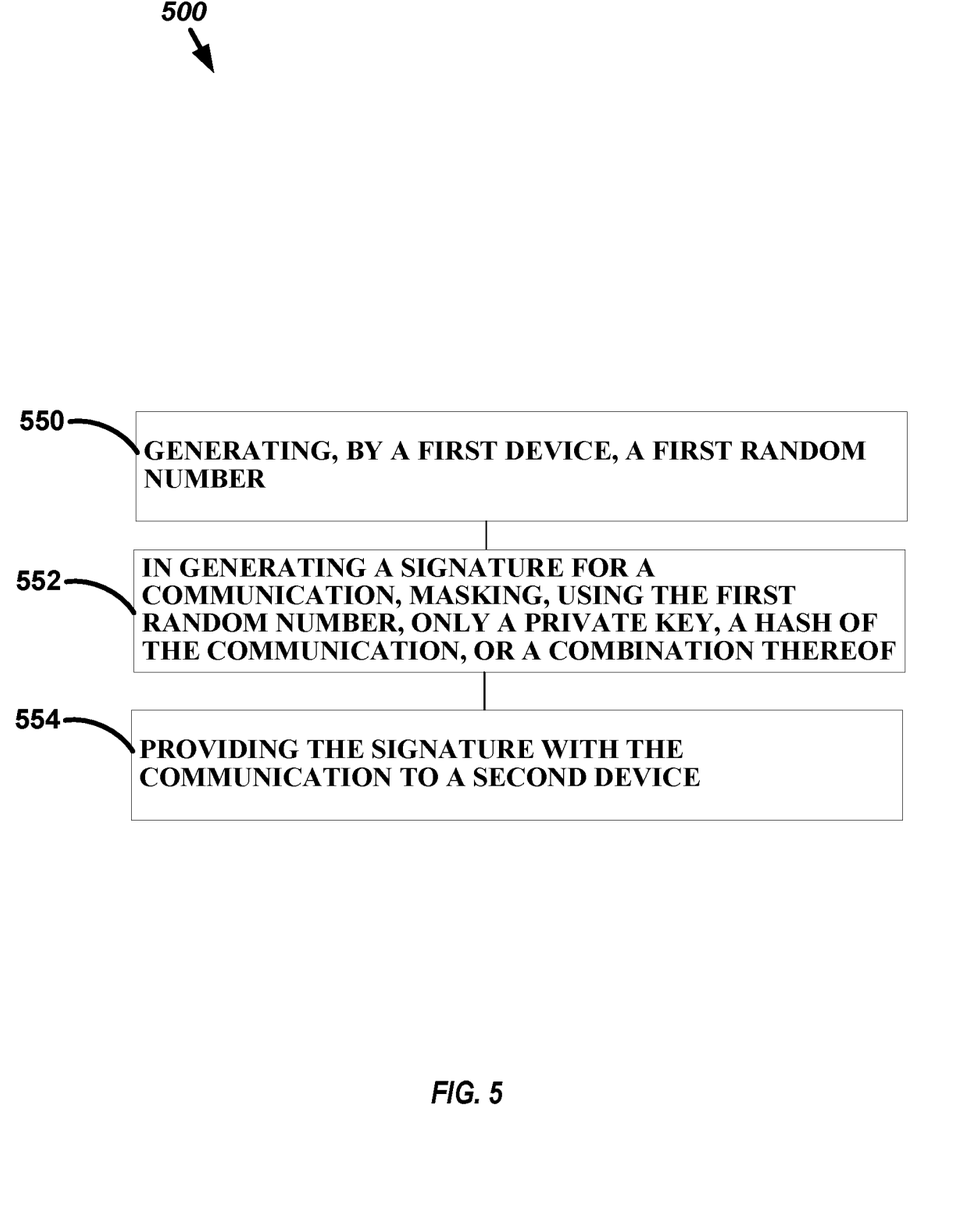
FIG. 5 illustrates, by way of example, a diagram of an embodiment of a method for DSA security.

FIG. 5 illustrates, by way of example, a diagram of an embodiment of a method 500 for DSA security. The method 500 as illustrated includes generating, by a first device, a first random number, at operation 550; in generating a signature for a communication, masking, using the first random number, only a private key, a hash of the communication, or a combination thereof, at operation 552; and providing the signature with the communication to a second device, at operation 554.

The method 500 can further include, wherein masking the private key, the hash of the communication, or a combination thereof consists of masking only the private key.

The method 500 can further include subtracting the first random number from the private key resulting in P1. The method 500 can further include operating, in a first iteration of multiplication and addition circuitry, on P1 resulting in a first result. The method 500 can further include operating, in a second iteration of the multiplication and addition circuitry, on the first random number resulting in a second result. The method 500 can further include combining the first and second results to generate the signature.

The method 500 can further include providing, by a multiplexer, P1 for the first iteration and the first random number for the second iteration. The method 500 can further include providing, by a register, the first random number to the multiplexer. The method 500 can further include providing, by a register and during a first clock cycle, the first result. The method 500 can further include providing, by the register and during a second clock cycle, the second result.

Masking the private key, the hash of the communication, or a combination thereof can consist of masking only the private key and the hash of the communication. The method 500 can further include generating a second random number. The method 500 can further include subtracting the first random number from the private key resulting in P1. The method 500 can further include subtracting the second random number from the hash of the communication resulting in H1. The method 500 can further include operating, in a first iteration of multiplication and addition circuitry, on P1 and H1 resulting in a first result. The method 500 can further include operating, in a second iteration of the multiplication and addition circuitry, on the first random number and the second random number resulting in a second result. The method 500 can further include combining the first and second results to generate the signature.

The method 500 can further include providing, by a first multiplexer, P1 for the first iteration and the first random number for the second iteration. The method 500 can further include providing, by a second multiplexer, H1 for the first iteration and the second random number for the second iteration. The method 500 can further include providing, by a first register, the first random number to the first multiplexer. The method 500 can further include providing, by a second register, the second random number to the second multiplexer. The method 500 can further include providing, by a third register and during a first clock cycle, the first result. The method 500 can further include providing, by the third register and during a second clock cycle, the second result.

Figure 6:
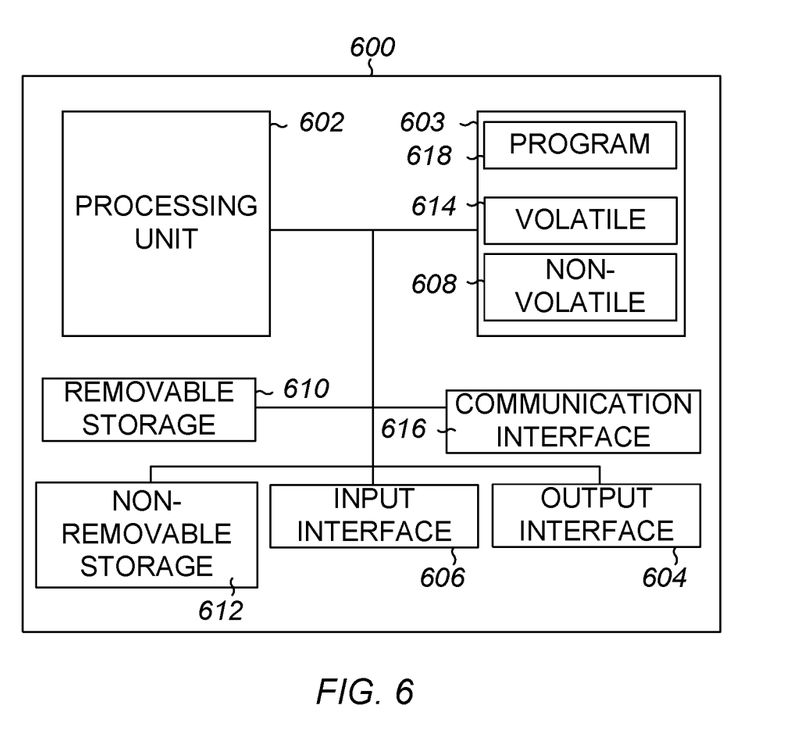
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One or more of the device 102, 104, cryptographic circuitry 106, 108, addition 222, multiplication 220, 224, circuit 200, 300, or 400, or method 500 or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input component. The input 606 may include one or more of a touchscreen, touchpad, mouse, keyboard, camera, one or more device-specific buttons, one or more sensors integrated within or coupled via wired or wireless data connections to the machine 600, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 includes a method for digital signature algorithm security, the method comprising generating, by a first device, a first random number, in generating a signature for a communication, masking, using the first random number, only a private key, a hash of the communication, or a combination thereof, and providing the signature with the communication to a second device.

In Example 2, Example 1 further includes, wherein masking the private key, the hash of the communication, or a combination thereof consists of masking only the private key.

In Example 3, Example 2 further includes subtracting the first random number from the private key resulting in P1, operating, in a first iteration of multiplication and addition circuitry, on P1 resulting in a first result, operating, in a second iteration of the multiplication and addition circuitry, on the first random number resulting in a second result, and combining the first and second results to generate the signature.

In Example 4, Example 3 further includes providing, by a multiplexer, P1 for the first iteration and the first random number for the second iteration.

In Example 5, Example 4 further includes providing, by a register, the first random number to the multiplexer.

In Example 6, at least one of the Examples 3-5 further includes providing, by a register and during a first clock cycle, the first result, and providing, by the register and during a second clock cycle, the second result.

In Example 7, at least one of Examples 1-6 further includes, wherein masking the private key, the hash of the communication, or a combination thereof consists of masking only the private key and the hash of the communication.

In Example 8, Example 7 further includes generating a second random number.

In Example 9, Example 8 further includes subtracting the first random number from the private key resulting in P1, subtracting the second random number from the hash of the communication resulting in H1, operating, in a first iteration of multiplication and addition circuitry, on P1 and H1 resulting in a first result, operating, in a second iteration of the multiplication and addition circuitry, on the first random number and the second random number resulting in a second result, and combining the first and second results to generate the signature.

In Example 10, Example 9 further includes providing, by a first multiplexer, P1 for the first iteration and the first random number for the second iteration, and providing, by a second multiplexer, H1 for the first iteration and the second random number for the second iteration.

In Example 11, Example 10 further includes providing, by a first register, the first random number to the first multiplexer, and providing, by a second register, the second random number to the second multiplexer.

In Example 12, at least one of Examples 9-11 further includes providing, by a third register and during a first clock cycle, the first result, and providing, by the third register and during a second clock cycle, the second result.

In Example 13 a device is configured to implement the method of one of Examples 1-12.

In Example 14 a system is configured to perform the method of one of Examples 1-12.

Example 15 includes a tangible computer-readable medium including instructions that, when executed by a machine, cause the machine to perform the method of one of claims 1-12.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for digital signature algorithm (DSA) security, the method comprising:
   generating, by a first device, a first random number;
   in generating a signature for a communication, masking, using the first random number, only a private key by:
     subtracting the first random number from the private key resulting in P1;
     operating, in a first iteration of multiplication and addition circuitry, on P1 resulting in a first result;
     operating, in a second iteration of the multiplication and addition circuitry, on the first random number resulting in a second result; and
     combining the first and second results to generate the signature; and
   providing the signature with the communication to a second device.

2. The method of claim 1, further comprising providing, by a multiplexer, P1 for the first iteration and the first random number for the second iteration.

3. The method of claim 2, further comprising providing, by a register, the first random number to the multiplexer.

4. The method of claim 1, further comprising:
   providing, by a register and during a first clock cycle, the first result; and
   providing, by the register and during a second clock cycle, the second result.

5. A device comprising:
   processing circuitry; and
   a memory comprising instructions that, when executed by the processing circuitry, cause the processing circuitry to perform operations for digital signature algorithm (DSA) security, the operations comprising:
     generating a first random number;
     in generating a signature for a communication, masking, using the first random number, only a private key by:
       subtracting the first random number from the private key resulting in P1;
       operating, in a first iteration of multiplication and addition circuitry, on P1 resulting in a first result;
       operating, in a second iteration of the multiplication and addition circuitry, on the first random number resulting in a second result; and
       combining the first and second results to generate the signature; and
     providing the signature with the communication to a second device.

6. The device of claim 5, wherein the operations further comprise providing, by a multiplexer, P1 for the first iteration and the first random number for the second iteration.

7. A computer-readable medium including instructions that, when executed by a machine, cause the machine to perform operations for digital signature algorithm (DSA) security, the operations comprising:
   generating a first random number;
   generating a second random number;
   in generating a signature for a communication, masking, using the first random number and the second random number, a combination of a private key and a hash of the communication by:
     subtracting the first random number from the private key resulting in P1;
     subtracting the second random number from the hash of the communication resulting in H1;
     operating, in a first iteration of multiplication and addition circuitry, on P1 and H1 resulting in a first result;
     operating, in a second iteration of the multiplication and addition circuitry, on the first random number and the second random number resulting in a second result; and
     combining the first and second results to generate the signature; and
   providing the signature with the communication to a second device.

* * * * *